H. C. BIETTE.
PERCOLATOR.
APPLICATION FILED MAR. 26, 1921.

1,405,662.

Patented Feb. 7, 1922.
2 SHEETS—SHEET 1.

Witness
R. F. Dilworth

Inventor
H. C. Biette
by F. N. Barber
his attorney

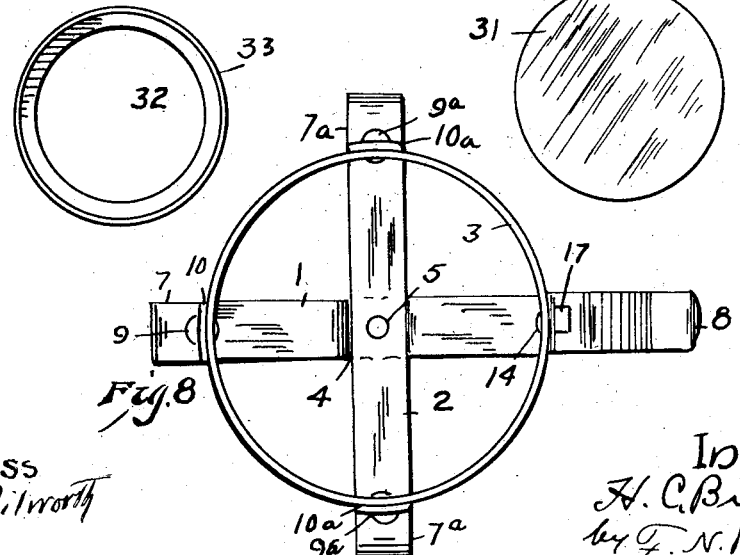

UNITED STATES PATENT OFFICE.

HENRY CLAYTON BIETTE, OF PITTSBURGH, PENNSYLVANIA.

PERCOLATOR.

1,405,662.  Specification of Letters Patent.  Patented Feb. 7, 1922.

Application filed March 26, 1921. Serial No. 455,709.

*To all whom it may concern:*

Be it known that I, HENRY CLAYTON BIETTE, a citizen of the United States, residing at Pittsburgh, in the county of Allegheny and State of Pennsylvania, have invented new and useful Improvements in Percolators, of which the following is a specification.

My invention relates to percolators.

One of the objects of my invention is to provide a combined percolator and serving device of novel construction, and to produce a percolator in which the time required for the extraction of the soluble elements from the coffee may be varied according to the coarseness of the fragments into which the coffe is broken. Another object is to provide a spreader between the ground coffee holder and the water which falls upon the coffee and percolates through it. Another object is to provide a perforated separation and spreader disk above the ground coffee to keep the ground coffee in a concentrated condition. Other objects pertain to the construction of the holder for the container of the brew and to the construction of the handle for the holder and the common cover for the percolator and the said container.

Figure 1:
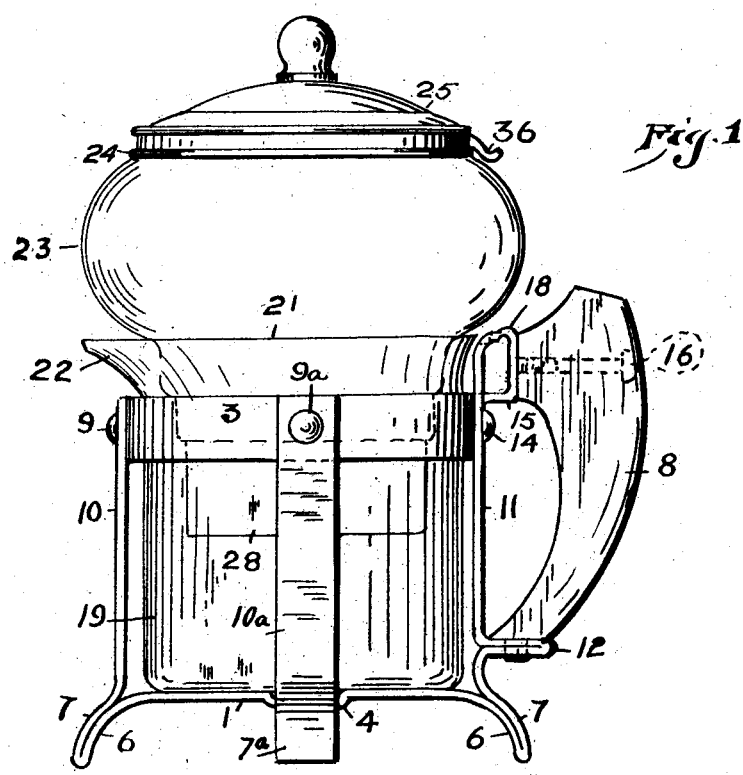
Figure 2:
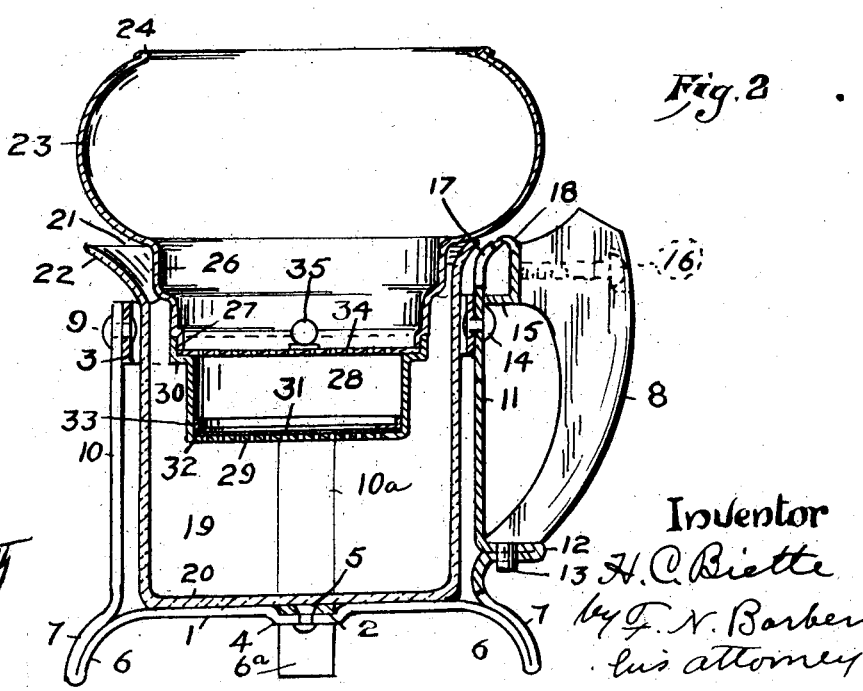

Referring to the accompanying drawings, Fig. 1 is a side elevation of my improved percolator; Fig. 2, a central vertical section of Fig. 1, the section being through the pouring spout or lip and the handle being shown in side elevation; Fig. 3, an enlarged central vertical section of the container for the ground coffee and of the spreader separation disk, the filter paper, and one of the devices for determining the time for the water to percolate through the coffee; Fig. 4, a plan view of Fig. 3 on a reduced scale with the removable parts thereof omitted; Fig. 5, a plan view of the spreader or separation disk; Fig. 6, a plan of one of said time determining devices; Fig. 7, a plan view of the filtering disk or medium; and Fig. 8, a plan of the holder.

On the drawings, I show a holder or frame comprising the crossed metal strips or members 1 and 2 and the circular metal ring or member 3. The member 1 has a transverse depressed portion 4 to receive the crossing member 2, so that the upper surfaces of the members 1 and 2 may be flush, or at the same level. A rivet 5 in the crossing portion of the members 1 and 2 holds them rigidly together. The member 1 extends out horizontally at equal distances from the rivet 5 and then curves downwardly to form the inner leg members 6 and then backwardly on the outer face of the members 6 to form the outer leg members 7. That end of the member 1 which is opposite the place where the handle 8 is to be seated extends up vertically from the leg member 7 to the ring 3, to which it is connected by the rivet 9. That end of the member 1 is marked 10.

11 designates the vertical member at the remaining end of the member 1. At a short distance above its leg member 7, the member 11 is bent outwardly and reversely to form the horizontal support or shoulder 12 having a vertical opening to receive the lug 13 on the lower end of the handle 8. The member 11 is connected to the ring 3 by the rivet 14, and above the ring 3 it is bent outwardly, downwardly, and inwardly to form a loop 15, to the outer face of which the upper end of the handle 8 is secured by the screw 16. The inner member of the loop is provided with the slot 17. The upper member of the loop extends upwardly at its outer end somewhat above the inner end as shown at 18.

The member 2 extends laterally in both directions from the rivet 5 the same distance that the member 1 extends laterally from the rivet. The member 2 has leg members 6ᵃ and 7ᵃ preferably constructed like the leg members 6 and 7, and has above the latter members the vertical end members 10ᵃ connected by the rivets 9ᵃ to the ring 3.

The preferably glass container 19, which is also a serving or pouring vessel, has its bottom 20 seated on the base or crossed portions of the frame members 1 and 2 and its circular side wall standing in the ring 3 with its upper edge 21 somewhat above the ring 3. The container has in the edge 21 the pouring lip 22 arranged opposite the handle 8.

23 is a preferably nickel-plated copper percolating vessel having its upper portion in the shape of a hollow spheroid with its lower side resting on the edge 21 of the container 19. The upper side of the vessel is horizontal and has the opening 24 provided with the cover 25. The lower side of the spheroidal portion of the vessel 23 has the downward extension 26 terminating in the circular edge 27. 28 is a cup-like container for the ground coffee. It has the horizontal perforated circular bottom 29 and the annular horizontal shoulder 30 near its upper edge. The upper end of the container 28 telescopes over the end 27. While the parts 27 and 28 may be prevented from accidental disengagement by various means, I find that if they have a close fit, the friction between them forms a satisfactory securing means. 31 is a disk of filter medium, as paper, resting on the upper face of the bottom 29, and 32 is a circular gage ring fitting the container 28 and lying on the filter paper 31. It has the upstanding stiffening flange 33 in engagement with the inner face of the container. The perforated spreader disk 34 is held between the shoulder 30 and the edge 27. It is provided with the knob 35 by which it can be removed or replaced.

The parts being as shown in Fig. 2, and ground coffee being in the container 28 between the filter paper 31 and the spreader 34, the required amount of water is poured into the vessel 23 through the opening 24. The water passes first through the spreader, by which the water is evenly spread or distributed to the ground coffee. The water is thus caused to percolate evenly throughout the coffee. The water charged with the soluble matter in the coffee, that is, the brew, passes through a filter paper 31 and the perforations in the bottom 29 and collects in the container, or pouring vessel 19. If desired the liquor in the vessel 19 may be passed through the coffee again. The vessel 23 with its pendent parts is removed and the cover 25 may be placed on the vessel 19 with the upwardly curved tongue 36 in the slot 17. This tongue serves to prevent the cover from sliding on the vessel 19, particularly when the latter is tilted to pour out coffee through the lip 22. Several gage rings may be provided, each covering a different percentage of the area of the filter 31 or the perforated portion of the bottom 29. When coarse coffee is used the gage ring covering more of the filter 31 or bottom 29 is used than when the coffee is ground fine. The proper disk for the size of the broken fragments of the coffee will be selected so as to give the desired strength of the brew.

I claim:

1. In a percolator, a pouring vessel, a vessel divided into upper and lower sections and supported at the top of the pouring vessel, the lower section having a perforate bottom, a filtering medium on the said bottom, and a perforate water-spreader in the vessel above the said medium, the space between the spreader and the medium forming a chamber for the material from which solubles are to be extracted, the spreader being held in place between the opposing portions of the two sections.

2. In a percolator, a pouring vessel and a water containing and percolating vessel, supported at the upper end of the first vessel and having a portion pendent within the same, the second vessel having two sections, the upper section having an endless lower edge and the second section being a cup-like member telescoping the said edge and having a shoulder beneath the said edge, in combination with a perforated spreader between edge and shoulder, the said member having a perforated bottom covered with a filtering medium.

3. In a percolator, a pouring vessel and a water containing and percolating vessel, supported at the upper end of the first vessel and having a portion pendent within the same, the second vessel having two sections, the upper section having an endless lower edge and the second section being a cup-like member telescoping the said edge, in combination with a perforated spreader held between the two sections, the said member having a perforated bottom covered with a filtering medium.

4. In a percolator, a vessel having a perforate bottom, a filtering medium on the said bottom, and stable means for varying the time for the passage without varying the quality of a definite quantity of fluid through the filter in accordance with the degree of coarseness of the material whose soluble matter is to be extracted by fluid passing through the vessel and the said medium.

5. In a percolator, a vessel having a perforate bottom, a filtering medium on the said bottom, and means for limiting the filtering area of the said medium in accordance with the coarseness of the material whose soluble matter is to be extracted by fluid passing through the vessel and the said medium.

6. In a percolator, a vessel having a perforate bottom, a filtering medium on the said bottom, and combined means for holding the medium in place and limiting the filtering area of the said medium in accordance with the coarseness of the material whose soluble matter is to be extracted by fluid passing through the vessel and the said medium.

7. A pouring vessel, a percolating vessel superposed on the pouring vessel, a holder adapted to receive the first vessel and having a metal strip slotted next to the first vessel, and a removable cover fitting both vessels and having a lug adapted to interlock with the said slotted portion of the holder and prevent the lateral displacement of the cover when seated on the first vessel after the second vessel has been removed from the first vessel.

8. A pouring vessel, a percolating vessel superposed on the pouring vessel, a holder adapted to receive the first vessel and having a metal strip slotted next to the first vessel and bent outwardly and downwardly, a removable cover for the first vessel having a lug adapted to interlock with the said slotted portion of the holder and prevent the lateral displacement of the cover, and a handle secured to the downwardly bent portion of the said strip.

Signed at Pittsburgh, Pa., this 23rd day of March, 1921.

HENRY CLAYTON BIETTE.